March 7, 1933. H. C. A. BEHRENS 1,900,789
APPARATUS FOR SEPARATING SALTS OR OTHER MATERIALS FROM LIQUIDS
Filed Dec. 4, 1929
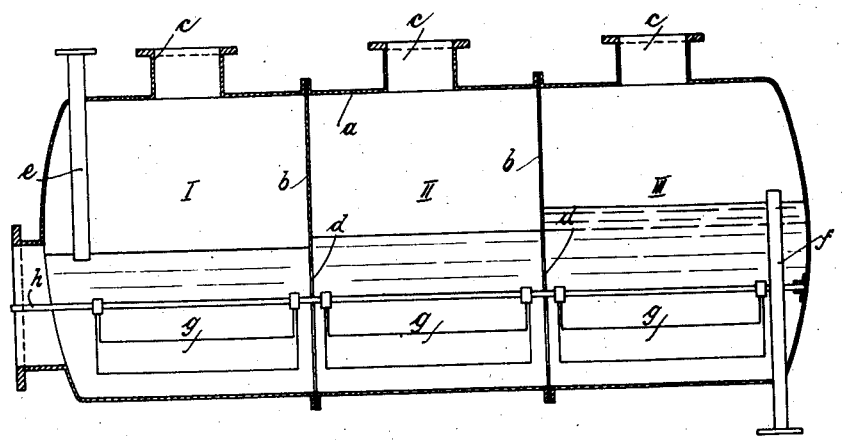
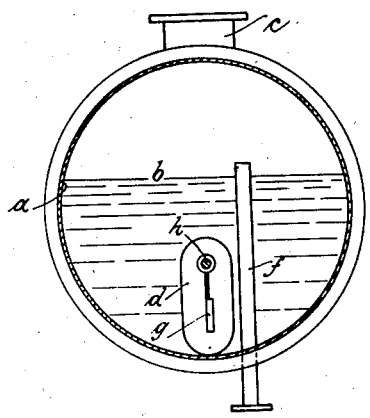
H.C.A.Behrens
Inventor Patented Mar. 7, 1933

1,900,789

UNITED STATES PATENT OFFICE

HANS CHRISTIAN AUGUST BEHRENS, OF HAMBURG, GERMANY, ASSIGNOR OF ONE-HALF TO THE FIRM RUD. OTTO MEYER, OF HAMBURG, GERMANY, AND ONE-HALF TO THE FIRM KUPFERHÜTTE ERTEL, BIEBER & CO., OF HAMBURG, GERMANY

APPARATUS FOR SEPARATING SALTS OR OTHER MATERIALS FROM LIQUIDS

Application filed December 4, 1929, Serial No. 411,649, and in Germany December 4, 1928.

This invention relates to improvements in apparatus for crystallization from solutions by evaporation under reduced pressure.

The present improved apparatus comprises a common tank partitioned to constitute a series of vapor separating chambers adjoined to one another, each chamber being equipped with its own evacuating means and fitted with an agitator located in the lower part of the chamber, the partitions between adjacent chambers extending to the bottom of the tank and being each formed beneath the liquid level with an opening for passage of solution from one chamber to the next, the last chamber only of the series being provided with an outlet leg for the crystals.

In the accompanying drawing apparatus according to the invention is illustrated by way of example in Fig. 1 in longitudinal section and in Fig. 2 in transverse section.

The construction shown consists of a horizontal cylindrical tank "a" which is divided by two transverse partitions "b" extending to the bottom of the tank into three evaporator chambers or cells I, II and III. The tank "a" is provided on top with three connecting pipes "c" and the usual steam jet ejectors, not shown, for evacuating the chambers. The tank a is, for example filled half full with a solution from which a salt is to be crystallized, for instance with lye. Through openings "d" in the partitions the solution can pass from the chamber I to the chambers II and III.

The solution is admitted to the chamber I by way of the pipe "e" leading to a point below the liquid level. By an overflow pipe f arranged in the chamber III the cooled solution with the crystals in suspension is allowed to run off. Each chamber is provided with an agitator. The agitators each consist of a blade "g," connected to a common shaft h by means of arms. The shaft "h", which is journalled in any suitable manner, passes through the openings "d" in the partitions "b".

As will be understood, the solution entering the chamber I by the pipe "e" is cooled under the reduced pressure. From the chamber I the solution passes by way of the opening "d" in the first partition "b" into the chamber II, where it is further cooled under lower reduced pressure. In the chamber III further cooling down is effected under still lower reduced pressure. Finally the solution with the crystals in suspension flows out by the overflow pipe "f."

The invention is not limited to the provision of any particular number of chambers, because evidently more or less than three chambers may be provided.

I claim:

1. A process for separating out salts and the like from liquids by the use of high vacuum, comprising placing the salt solution in a tank having several independent stages, said stages then being subjected to varying degrees of vacuum, separating said solution in said stages, lowering the temperature throughout said separation and finally withdrawing said separated salts from the last stage.

2. A device for separating out salts comprising a tank, partitions in said tank dividing said tank into separate adjacent compartments, means for creating an independent vacuum in each of said compartments, said partitions extending downwardly below the surface of the solution in said tank and being constructed and arranged so as to permit intercommunication of said solution between the various compartments and means for withdrawing the separated salt in the last compartment.

In testimony whereof I have signed my name to this specification.

HANS CHRISTIAN AUGUST BEHRENS.